United States Patent [19]

Getson et al.

[11] 4,221,693

[45] Sep. 9, 1980

[54] COMPOSITION FREE OF SURFACE CURE INHIBITION AND METHOD FOR PREPARING THE SAME

[76] Inventors: John C. Getson, 4394 Hampton Ct., Adrian, Mich. 49221; Charles G. Neuroth, 10557 Crockett Hwy., Blissfield, Mich. 49228

[21] Appl. No.: 16,760

[22] Filed: Mar. 2, 1979

[51] Int. Cl.$^2$ ............................................... C08L 83/04
[52] U.S. Cl. ............................... 260/37 SB; 106/307; 260/42.15; 528/17; 528/33; 528/34
[58] Field of Search .......................... 528/17, 33, 34; 260/37 SB, 42.15; 106/307

[56] References Cited

U.S. PATENT DOCUMENTS

| | | | |
|---|---|---|---|
| 4,111,890 | 9/1978 | Getson et al. | 260/37 SB |
| 4,151,344 | 4/1979 | Doss et al. | 528/33 |

*Primary Examiner*—Melvyn I. Marquis

[57] ABSTRACT

A room temperature vulcanizable composition which is stable under anhydrous conditions, but when exposed to atmospheric moisture cures to an elastomeric solid comprising (1) a hydrocarbonoxy terminated linear organopolysiloxane containing at least two hydrocarbonoxy groups per molecule, (2) an organo-silicon compound or partial hydrolyzates thereof containing at least two hydrocarbonoxy groups, (3) a titanium ester or partial hydrolyzates thereof, in which the hydrocarbonoxy groups linked to the organopolysiloxane (1), organosilicon compound (2) and titanium ester (3) are the same, and (4) carbon black which has been intimately combined with or treated with a hydrophobic agent to impart hydrophobic properties thereto, in which the hydrophobic agent is inert to the hydrocarbonoxy groups linked to the organopolysiloxane (1), organosilicon compound (2) and titanium ester (3).

12 Claims, No Drawings

COMPOSITION FREE OF SURFACE CURE INHIBITION AND METHOD FOR PREPARING THE SAME

The present invention relates to a room temperature vulcanizable composition and more particularly to a room temperature vulcanizable composition containing carbon black. More particularly, the invention relates to a method for preparing a composition containing carbon black which is free of surface cure inhibition.

BACKGROUND OF THE INVENTION

When carbon black is incorporated in a room temperature vulcanizable composition such as described in U.S. Pat. No. 4,111,890 to Getson et al, the resultant composition is thixotropic, but exhibits poor shelf-life. Moreover, when the composition is cured in atmospheric moisture, the surface cure appears to be incomplete and the carbon black can be easily transferred (rubbed-off) from the surface of the cured composition. However, it has been found that when the carbon black is treated with a hydrophobic agent, a thixotropic composition is obtained which upon curing to an elastomeric solid is resistant to the transfer (rub-off) of carbon black from the cured surface. Furthermore, it has been found that the resultant composition exhibits better shelf stability over longer periods of time.

Therefore it is an object of this invention to provide a room temperature vulcanizable composition which is thixotropic and has non-slump properties. Another object of this invention is to provide a room temperature vulcanizable composition containing carbon black which is substantially free of carbon black rub-off from the cured surface. A further object of this invention is to provide a method for incorporating carbon black into a room temperature vulcanizable composition without inhibiting the surface cure of the composition. A still further object of this invention is to provide a method of incorporating carbon black into a room temperature vulcanizable composition and eliminate rub-off of the carbon black from the cured surface.

SUMMARY OF INVENTION

The foregoing objects and others which will become apparent from the following description are accomplished in accordance with this invention, generally speaking, by providing a composition which is stable under anhydrous conditions, but cures to an elastomeric solid when exposed to moisture comprising (1) a hydrocarbonoxy terminated linear organopolysiloxane containing at least two hydrocarbonoxy groups per molecule, (2) an organosilicon compound or partial hydrolyzates thereof containing at least two hydrocarbonoxy groups, (3) a titanium ester or partial hydrolyzates thereof, in which the hydrocarbonoxy groups linked to the organopolysiloxane (1), organosilicon compound (2) and titanium ester (3) are the same and (4) carbon black which has been intimately combined with or treated with a hydrophobic agent to impart hydrophobic properties thereto, in which the hydrophobic agent is inert to the hydrocarbonoxy groups linked to the organopolysiloxane (1), organosilicon compound (2) and titanium ester (3). The carbon black may be treated by intimately mixing the carbon black with a filler which has hydrophobic properties or the carbon black may be treated with a hydrophobic agent and then mixed with the composition containing organopolysiloxane (1) organosilicon compound (2) and titanium ester (3).

DETAILED DESCRIPTION OF THE INVENTION

Room temperature vulcanizable compositions containing (1) organopolysiloxanes having at least two hydrocarbonoxy groups per molecule, (2) organosilicon compounds and (3) titanium esters are described in U.S. Pat. No. 4,111,890 to Getson et al and is incorporated herein by reference.

The organopolysiloxanes containing hydrocarbonoxy groups may be represented by the general formula

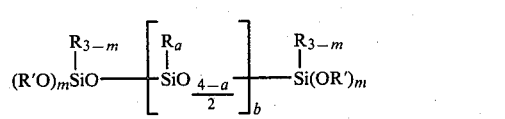

wherein R which may be the same or different represents monovalent hydrocarbon radicals, halogenated monovalent hydrocarbon radicals and cyanoalkyl radicals, R' is an aliphatic hydrocarbon radical having up to 10 carbon atoms, a has an average value of from 1.9 to 2.0, b has a value greater than 10 and m has a value of at least 2, and preferably 2 or 3.

Examples of suitable monovalent hydrocarbon radicals are alkyl radicals having from 1 to 18 carbon atoms, such as methyl, ethyl, propyl, butyl, hexyl, octyl, decyl and octadecyl radicals; cycloalkyl radicals such as the cyclopentyl and cyclohexyl radicals; aryl radicals such as the phenyl and naphthyl radicals, aralkyl radicals such as the benzyl radical, the alpha-,beta-phenylethyl radicals and the alpha-,beta-phenylpropyl radicals; alkaryl radicals such as the tolyl, xylyl and ethylphenyl radicals; halogenated derivatives of the aforesaid radicals including chloromethyl, trifluoromethyl, chloropropyl, chlorophenyl, dibromophenyl, tetrachlorophenyl and difluorophenyl radicals; and cyanoalkyl radicals such as beta-cyanoethyl, gamma-cyanopropyl and beta-cyanopropyl radicals. It is preferred that the R groups in Formula I have from 1 to 3 carbon atoms and more preferably that R be a methyl radical. Formula I is intended to include those materials wherein the R groups are mixtures of the aforesaid radical. Examples of aliphatic hydrocarbon radicals represented by R' are alkyl radicals, such as methyl, ethyl, propyl, butyl, hexyl, octyl and decyl radicals. For purposes of this invention, the organopolysiloxanes represented by Formula I above have a viscosity in the range of from 50 to 100,000 centipoise at 25° C., and preferably from 500 to 10,000 centipoise at 25° C.

It is understood, that Formula I is intended to include organopolysiloxanes which have terminal OR' groups and also contain OR' groups along the chain. It is preferred that the organopolysiloxanes have an average of at least two silicon bonded OR' groups per molecule, especially if the resultant composition is to be converted to an elastomer.

Suitable organopolysiloxanes are disclosed in U.S. Pat. Nos. 2,415,389, 2,815,300 and 3,164,614.

The organosilicon compounds (2) are selected from silanes having the general formula

and/or siloxanes of the general formula

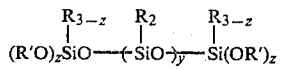

in which R and R' are the same as above, R" represents monovalent hydrocarbon radicals and halogenated monovalent hydrocarbon radicals having from 1 to 10 carbon atoms, n is 0, 1 or 2, y has a value of from 0 to 10 and z has a value of 1, 2 or 3.

Examples of suitable monovalent hydrocarbon radicals represented by R" are alkyl radicals such as methyl, ethyl, propyl, butyl, octyl and decyl radicals; cycloalkyl radicals such as the cyclohexyl radical; aryl radicals such as the phenyl radical; aralkyl radicals such as the benzyl radical, the alpha,-beta-phenylethyl and alpha-,beta-phenylpropyl radicals; alkaryl radicals such as the tolyl, xylyl and ethylphenyl radicals, halogenated derivatives of the aforesaid radicals including chloromethyl, trifluoromethyl, chloropropyl, chlorophenyl, dibromophenyl, tetrachlorophenyl and difluorophenyl radicals.

Examples of suitable silanes represented by Formula II above which may be employed in the composition of this invention are methyltrimethoxysilane, methyltriethoxysilane, methyltributoxysilane, methyltrihexoxysilane, methyltridecoxysilane, ethyltrimethoxysilane, ethyltributoxysilane, ethyltridecoxysilane, butyltrimethoxysilane, butyltributoxysilane, butyltridecoxysilane, octyltrimethoxysilane, octyltriethoxysilane, octyltributoxysilane, octyltridecoxysilane, dimethyldimethoxysilane, dimethyldipropoxysilane, dimethyldihexoxysilane, dimethyldioctoxysilane, dimethyldidecoxysilane, diethyldiethoxysilane, diethyldibutoxysilane, diethyldioctoxysilane, diethyldidecoxysilane, dipropyldimethoxysilane, dipropyldibutoxysilane, dipropyldioctoxysilane, dibutyldimethoxysilane, dibutyldiethoxysilane, dibutyldipropoxysilane, dihexyldiethoxysilane, dihexyldibutoxysilane, dihexyldihexoxysilane, octyldimethoxysilane, tetramethoxysilane, tetraethoxysilane, tetrabutoxysilane, tetrahexoxysilane, tetraoctoxysilane and partial hydrolyzates thereof such as the alkylpolysilicates, e.g., ethylsilicate "40", polypropylsilicates and polybutylsilicates.

Examples of siloxanes represented by Formula III above having at least two hydrocarbonoxy groups per molecule are 1,2-dimethoxy-1,1,2,2-tetramethyldisiloxane, 1,2-dimethyl-1,1,2,2-tetraethoxydisiloxane, 1,1,1,2,2,2-hexamethoxydisiloxane. As mentioned heretofore it is preferred that the siloxanes represented by Formula III have less than 10 silicon atoms per molecule.

Titanium compounds (3) which may be employed in the compositions of this invention are titanium esters having the formula $Ti(OR')_4$ in which R' is an alkyl radical having from 1 to 10 carbon atoms. Specific examples of titanium esters which are operative herein are titanium esters of monohydric alcohols such as tetramethyltitanate, tetraethyltitanate, tetrapropyltitanate, tetrabutyltitanate, tetra-(2-ethylhexyl)titanate, tetrahexyltitanate and tetraoctyltitanate. Partial hydrolyzates of any of the above titanates are also operative herein.

The amounts of organosilicon compound and titanium compound employed in the composition may vary within fairly wide limits. In the case of the organosilicon compound the weight ratio of organosilicon compound to organopolysiloxanes may vary from 1 to 10 to 1 to 50 and more preferably from 1 to 15 to 1 to 30 while the weight ratio of titanium compound to organopolysiloxane may vary from 1 to 15 to 1 to 40 and more preferably from 1 to 10 to 1 to 30. It is to be understood that the amounts are by weight based on the weight of the diorganopolysiloxane of Formula I.

When carbon black is incorporated into the room temperature vulcanizable composition containing (1) hydrocarbonoxy terminated organopolysiloxanes, (2) organosilicon compounds containing at least two hydrocarbonoxy groups per molecule and (3) the titanium ester, it appears that the surface cure rate is retarded. Moreover, even after complete curing, the carbon black is easily removed or rubbed-off at the surface. However, it has been found that if the carbon black is treated with a hydrophobic agent or is mixed with a filler which has been rendered hydrophobic, then the surface cure is substantially improved and the carbon black is not easily transferred or removed from the surface of the cured material.

Carbon black may be rendered hydrophobic by treating the same with a hydrophobic agent, or by intimately mixing carbon black with other fillers which have been treated with a hydrophobic agent or a mixture containing carbon black and other fillers may be treated with the hydrophobic agent. When carbon black is combined with fillers having hydrophobic properties, it is essential that the carbon content of the treated filler be greater than about 1 percent by weight in order to impart desirable properties to the resultant curable composition.

When carbon black is combined with fillers having hydrophobic properties, the ratio of carbon black to hydrophobic filler may range from 1:1 to about 50:1, preferably from 5:1 to 30:1 and more preferably from 10:1 to 20:1. Carbon black and the hydrophobic filler may be combined in a variety of ways. Thus, carbon black and the hydrophobic filler may be combined in a kettle, vessel, mixer or drum roller and agitated until the filler and carbon black have been uniformly mixed.

In another embodiment, the carbon black may be treated with a hydrophobic agent and used alone in the composition or the treated carbon black may be combined with treated or untreated fillers. It is however, essential that the hydrophobic agent be compatible with the room temperature vulcanizable composition, i.e., the hydrophobic agent must be inert with respect to the hydrocarbonoxy groups linked to the organopolysiloxanes (1), organosilicon compounds (2) and titanium ester (3).

Although it is not essential, often times it is preferred that fillers in addition to carbon black be incorporated in these compositions in order to impart desirable physical properties thereto. Examples of fillers which may be employed in combination with carbon black are treated or untreated fumed silicas, high surface area precipitated silicas, silica aero gels as well as coarser silicas such as diatomaceous earth, crushed quartz and the like. Other fillers which may be used are metallic oxide and fibrous fillers such as asbestos, fibrous glass and the like.

When carbon black is employed as the sole filler in the room temperature vulcanizable composition, the amount is not critical and may range from about 10 to 100 percent by weight and more preferably from 20 to 50 percent by weight based on the weight of the organopolysiloxane (1). However, when a mixture of carbon black and fillers are employed in the composition of this invention, the ratio of carbon black to fillers may range from 1:1 to 200:1, preferably from 2:1 to 100:1 and more preferably from 5:1 to 50:1. It is however, preferred that the total amount of carbon black and fillers not exceed about 100 percent by weight based on the weight of the organopolysiloxane (1).

Even though the particle size of the filler and carbon black is not critical, it is preferred that they range from about 5 millimicrons up to about 30 microns in diameter. Particles having a larger diameter may be used; however they may be more difficult to incorporate in the composition.

The fillers may be used in an amount of from 0 up to about 100 percent based on the weight of the organopolysiloxane (1).

These fillers should be free of water, hydroxyl groups and any other groups which may react with the titanium ester and the hydrocarbonoxy groups linked to the silicon atoms of the organopolysiloxanes and organosilicon compounds.

Carbon black and/or fillers may be treated with silicon containing compounds to impart hydrophobic properties thereto. Silicon containing compounds which may be used to treat carbon black and/or fillers are those of the general formula

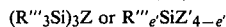
(R'''₃Si)₃Z or R'''$_{e'}$SiZ'$_{4-e'}$ wherein R''' which may be the same or different represents monovalent hydrocarbon radicals halogenated monovalent hydrocarbon radicals, Z and Z' represents halogen, hydrogen or a radical of the formula —OR'''', —NR''''X', or —ONR'''', and when e is 2, then Z may also represent —O— or NX'; R'''' is a hydrocarbon radical or a substituted hydrocarbon radical, preferably an alkyl radical having from 1 to 4 carbon atoms; X' is hydrogen or has the same meaning as R''''; e is 1 or 2 and e' is 1, 2 or 3.

It is essential that any residue resulting from the treatment of the carbon black and/or filler be removed prior to incorporating the treated materials into the composition of this invention. Thus, the treated materials should be substantially free of the groups represented by Z and Z'.

The monovalent and halogenated monovalent hydrocarbon radicals represented by R''' may be the same as the SiC-bonded organic radicals R'' linked to the organosilicon compounds. Suitable hydrocarbon radicals having from 1 to 10 carbon atoms are alkyl radicals, cycloalkyl radicals, alkenyl radicals, aryl radicals, alkaryl radicals, aralkyl radicals and halogenated derivatives thereof.

Examples of halogen atoms represented by Z and Z' are chlorine, bromine and iodine, with chlorine being the preferred example since it is readily available.

Suitable examples of hydrocarbon radicals represented by R''' are the methyl and the ethyl radicals. Additional examples of hydrocarbon radicals represented by R''' and R'''' are further illustrated in the silicon containing compounds which may be used to treat the fillers.

Examples of substituted hydrocarbon radicals represented by R''' are the methoxyethylene radical and the aminoethyl radical.

Suitable examples of silicon containing compounds which are known to impart hydrophobic properties to materials such as carbon black and fillers are hexamethyldisilazane, trimethylethoxysilane, trimethylchlorosilane, dimethyldiethoxysilane, vinyldimethylacetoxysilane, trimethylsilylisopropylamine, trimethylsilylethylamine, phenyldimethylsilypropylamine, vinyldimethylsilybutylamine, diethylaminoxytrimethylsilane, diethylaminoxyphenyldimethylsilane, 1,3-diphenyltetramethyldisilazane, dimethyldichlorosilane, dimethyldimethoxysilane, diphenyldiethoxysilane, vinylmethyldimethoxysilane and methyltriethoxysilane. It is preferred that the organosilicon compounds employed in the treatment of the carbon black and/or fillers be hexamethyldisilazane. When silanes containing hydrocarbonoxy groups are employed in the treatment of the carbon black and/or fillers, the hydrocarbonoxy groups should be identical with the ester group on the titanium compound and the hydrocarbonoxy groups linked to the silicon atoms of the organopolysiloxanes and organosilicon compounds.

Other silicon compounds which may be used to treat carbon black and/or fillers are cyclic alkyl polysiloxanes such as hexamethylcyclotrisiloxane and octamethylcyclotetrasiloxane.

Carbon black and/or fillers can be reacted with the silicon containing compounds by any conventional technique known in the art. These materials may be reacted with silicon containing compounds which evaporate at room temperature in a sealed container such as for example a polyethylene bag. In addition, carbon black and/or fillers may be mixed in a mixing device with a liquid hydrophobic-imparting silicon compound. Also, these materials can be reacted with a hydrophobic-imparting silicon compound in a fluidized bed and if desired, in the presence of a stream of inert gas.

Apart from the carbon black and fillers described heretofore, additives such as pigments, antioxidants, ultraviolet absorbents, fungicides, plasticizers and internal plasticizers may be included in the compositions of this invention. Here again it is essential that the additives be free of residual water, hydroxyl groups or other groups which would react with the titanium ester or the hydrocarbonoxy groups linked to the silicon atoms of the organopolysiloxanes and organosilicon compounds.

Compounds which have been used heretofore as plasticizers may be incorporated in the compositions of this invention. Examples of suitable compounds are triorganosiloxy-endblocked diorganopolysiloxanes having a viscosity of from 50 to 250 centipoise at 25° C., such as trimethylsiloxy-endblocked dimethylpolysiloxanes, trimethylsiloxy-endblocked methylphenylpolysiloxanes, triethylsiloxy-endblocked diethylpolysiloxanes and mixtures thereof. Organopolysiloxanes which are end-blocked on one end with at least one terminal hydrocarbonoxy group and on the other end with a triorganosiloxy group may also be employed in the compositions of this invention. These organopolysiloxanes have been defined as internal plasticizers. However, it is essential that the terminal hydrocarbonoxy groups on the internal plasticizers be the same group as the hydrocarbonoxy groups linked to the silicon atoms on the organopolysiloxanes, the organosilicon compounds and the titanium ester.

Although the order of mixing the ingredients is not critical, it is preferred that carbon black, which has been treated with a hydrophobic agent or combined with a treated filler, be mixed with the organopolysiloxanes (1), prior to the addition of the organosilicon compounds (2) and titanium compound (3). When carbon black is used in combination with a treated filler, the carbon black and treated filler may be mixed with the organopolysiloxane (1) prior to the addition of the other ingredients. It is however, preferred that the carbon black be premixed with the treated filler and the resultant mixture combined with the organopolysiloxanes (1).

The vulcanizable compositions of this invention are conveniently prepared by mixing the reactants at room temperature in the absence of moisture. It is preferred that the organosilicon compound and the titanium ester be added to the organopolysiloxane and carbon black and the mixture thus obtained be transferred into fluid-tight receptacles in which they can be kept for several months. The resultant compositions are stable in the absence of moisture, consequently they can be stored for prolonged periods of time without deleterious affects. During this period of storage, little or no change occurs in the physical or application properties of the compositions. This is of particular importance from a commercial standpoint since it assures that once a composition is prepared with a certain consistency and cure time, that neither will change to any great extent upon storage.

These compositions may be employed for many applications. They are useful for caulking, coating articles, for example electronic equipment, for coating fabrics, as gasket materials, glass and metal coatings and as sealants for various substrates.

Upon exposure to a moist atmosphere these compositions cure to an elastomeric solid. The moisture present in the ambient air is generally sufficient for this treatment, but it is also possible to expose the product which is to be cured, to an atmosphere artificially charged with moisture. Although the curing can take place without difficulty at room temperature, that is to say at from about 15° to 25° C., it is possible if desired to operate at an elevated temperature and even in a hot moist atmosphere such as steam.

The duration of the curing may be varied within fairly wide limits. Thus it depends upon the nature of the diorganopolysiloxanes, upon the proportion of organosilicon compound and titanium ester in the composition, upon the thickness of the application, upon the degree of humidity and upon temperature. At ambient temperatures and in air the compositions are normally cured in a period of between several hours up to about 7 days.

In the following examples all parts are by weight unless otherwise specified.

Treatment of Filler (a) Finely divided fumed silica having a surface area of at least 50 square meters per gram is placed in a drum roller with from 2 to 10 percent by weight of water and from 10 to 25 percent by weight based on the weight of filler of hexamethyldisilazane and the mixture is tumbled for from 10 to 18 hours at a temperature of from about 15 up to about 50° C. The treated silica filler is then placed in an air oven and dried at from 100° to 150° C. for 10 to 24 hours. The treated filler has a carbon content of from 2.5 to 3.5 percent by weight.

(b) The filler treated in accordance with (a) above is mixed with carbon black in a ratio of 5 parts of carbon black to 1 part of treated silica.

(c) The procedure described in (b) above is repeated, except that carbon black is mixed with the treated silica in a ratio of 20 parts of carbon black to 1 part of treated silica.

EXAMPLE 1

To a 1000 milliliter glass reactor equipped with a stirrer, nitrogen inlet and reflux condenser are added 600 parts of a hydroxyl terminated dimethylpolysiloxane fluid having a viscosity of 4000 centipoise at 25° C., 180 parts of a trimethylsiloxy-endblocked dimethylpolysiloxane fluid having a viscosity of 50 centipoise at 25° C. and 78 parts of tetraethyl orthosilicate. The system is flushed with nitrogen and heated to a temperature of about 170° C. with agitation and refluxed for 18 hours. After stripping for about 6 hours at a temperature of from 110° to 120° C. a triethoxy-endblocked dimethylpolysiloxane fluid is recovered.

About 50 parts of the triethoxy-endblocked dimethylpolysiloxane fluid prepared above are mixed with 25 parts of the filler prepared in accordance with (b) above. About 2.5 parts of tetraethyltitanate and 1 part of methyltriethoxysilane are added to the mixture and mixed under anhydrous conditions for 10 minutes. After storing under anhydrous conditions for 1 day and again after 30 days, the skin-over time is determined by exposing a sample of the mixture to atmospheric moisture at room temperature. The physical properties are determined after curing for 7 days in accordance with ASTM D-412. The physical properties are shown in the table. Essentially no carbon black is removed by rubbing the cured surface.

EXAMPLE 2

About 50 parts of the triethoxy-endblocked dimethylpolysiloxane fluid prepared in Example (1) above are mixed with 25 parts of the filler prepared in accordance with (c) above. About 2.5 parts of tetraethyltitanate and 1 part of methyltriethoxysilane are added to the mixture, and mixed under anhydrous conditions for 10 minutes and then stored under anhydrous conditions. A sample is exposed to atmospheric moisture and the skin-over time is determined. The physical properties are determined in accordance with ASTM D-412 and the results are shown in the table. The cured sample is essentially free of carbon black rub-off.

EXAMPLE 3

Finely divided fumed silica having a surface area of at least 50 square meters per gram is placed in a drum roller and heated to about 200° C. Hexamethylcyclotrisiloxane is an amount of about 10 percent by weight based on the weight of silica is heated to about 100° C. and then mixed with the fumed silica and the mixture tumbled for from 10 to 18 hours at a temperature of about 200° C. The treated filler has a carbon content of about 4 percent by weight. Carbon black is mixed with the treated filler in a ratio of carbon black to silica filler of 20:1.

About 50 parts of the triethoxy endblocked dimethylpolysiloxane fluid prepared in Example (1) are mixed with 25 parts of the filler prepared above. About 2.5 parts of tetraethyltitanate and 1 part of methyltriethoxysilane are added to the mixture and mixed under anhydrous conditions for 10 minutes. The mixture is exposed to atmospheric moisture at room temperature after storing for 1 day and again after about 33 days. The skin-over time is observed and the physical properties are determined after 7 days in accordance with ASTM D-412. The physical properties are shown in the table. Essentially no carbon black is removed by rubbing the cured surface.

EXAMPLE 4

When carbon black has been treated in accordance with the procedure described in (a) and combined with untreated fumed silica in a ratio of carbon black to fumed silica of 1:1, 5:1 and 20:1 and substituted for the filler of Example (2), the cured compositions show excellent resistance to the removal of carbon black from the cured surface by rubbing.

COMPARISON EXAMPLE V₁

The procedure of Example 2 is repeated except that 25 parts of untreated carbon black is substituted for the treated filler. The results are shown in the table. Carbon black is easily rubbed off from the cured surface.

COMPARISON EXAMPLE V₂

The procedure of Comparison Example V₁ is repeated except that a mixture containing untreated carbon black and fumed silica in a weight ratio of 20:1 are substituted for the treated filler. The results are shown in the table. Carbon black is easily rubbed off from the cured surface.

COMPARISON EXAMPLE V₃

The procedure of Example 2 is repeated except that a mixture containing untreated carbon black and fumed silica in a weight ratio of 1:1 is substituted for the treated filler. The results are shown in the table. Carbon black is easily rubbed off from the cured surface.

COMPARISON EXAMPLE V₄

The procedure of Example 2 is repeated except that a mixture containing untreated carbon black and silica in a weight ratio of 1:13.7 is substituted for the treated filler. The results are shown in the table. Carbon black is easily rubbed off the cured surface.

COMPARISON EXAMPLE V₅

The procedure of Example 2 is repeated except that a mixture containing untreated carbon black and fumed silica in a weight ratio of 20:1 is substituted for the treated filler. The fumed silica used in this Example has been partially treated to provide a carbon content of 1 percent by weight. The results are shown in the table. Carbon black is easily rubbed off the cured surface.

What is claimed is:

1. An organopolysiloxane composition which is stable under anhydrous conditions but when exposed to atmospheric moisture cures to an elastomeric solid at room temperature comprising (1) an organopolysiloxane of the formula

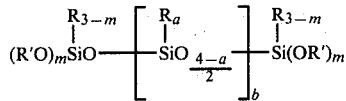

(2) an organosilicon compound selected from the group consisting of silanes of the formula

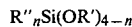

and siloxanes of the formula

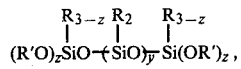

(3) a titanium compound of the formula

or partial hydrolyzates thereof in which R is selected from the group consisting of monovalent hydrocarbon radicals, halogenated monovalent hydrocarbon radicals having from 1 to 18 carbon atoms and cyanoalkyl radicals, R' is an aliphatic hydrocarbon radical having up to 10 carbon atoms, R" is selected from the group consisting of monovalent hydrocarbon radicals and halogenated monovalent hydrocarbon radicals having from 1 to 10 carbon atoms, a has an average value of from 1.9 to 2.0, b has a value greater than 10, m has a value of at least 2, n has a value of 0, 1 or 2, y has a value of from 0 to 10 and z has a value of 1, 2 or 3, with the proviso that the R' radicals in the siloxane, the organosilicon compound and the titanium compound must be identical and (4) carbon black which has been treated with a hydrophobic agent to impart hydrophobic properties thereto, in which the treated carbon black is inert to the R' radicals linked to the siloxane, the organosilicon

TABLE

| Example No. | Carbon Black (pts) Untreated | Silica, (parts) treated | Ratio Carbon Bl: Silica | Skin-over Time Days Storage | Skin-over Time Time Min. | Elongation % | Tensile psi | Durometer Shore A |
|---|---|---|---|---|---|---|---|---|
| 1 | 20.8 | 4.2 | 5:1 | 1 | 3 | 257 | 405 | 48 |
| 2 | 23.8 | 1.2 | 20:1 | 1 | 4 | 257 | 338 | 47 |
| 3 | 20.8 | 4.2 | 5:1 | 1<br>33 | 2<br>13 | 191 | 310 | 50 |

Resistance to rub-off was excellent.

| Comparison Example No. | Carbon Black (pts) Untreated | Silica (parts) untreated | | | | | | |
|---|---|---|---|---|---|---|---|---|
| V₁ | 25 | — | 100:0 | 1<br>31 | 10<br>64 | 209 | 319 | 43 |
| V₂ | 23.8 | 1.2 | 20:1 | 1<br>31 | 6<br>49 | 257 | 338 | 47 |
| V₃ | 12.5 | 12.5 | 1:1 | 1<br>35 | 18<br>125 | 75 | 184 | 43 |
| V₄ | 1.7 | 23.3 | 1:13.7 | 1<br>34 | 4<br>11 | 107 | 462 | 60 |
| V₅ | 23.8 | 1.2* (treated) | 20:1 | 1<br>31<br>52 | 4 | 177 | 338 | 44 |

*Carbon content 1% by weight
Resistance to rub-off was poor compound and the titanium compound, said hydrophobic agent is selected from the group consisting of cyclic alkyl polysiloxanes and silicon compounds of the formula $$(R'''_3Si)_eZ \text{ and } R'''_{e'}SiZ'_{4-e'}$$

in which R''' is selected from the group consisting of monovalent hydrocarbon radicals and halogenated monovalent hydrocarbon radicals, Z and Z' are selected from the group consisting of halogen, hydrogen and a radical of the formula —OR'''', —NR''''X' and —ONR'''' and when e is 2, then Z may be selected from the group consisting of —O— and NX', R'''' is selected from the group consisting of hydrocarbon radicals and substituted hydrocarbon radicals, X' is selected from the group consisting of hydrogen and R'''', e is 1 or 2 and e' is 1, 2 or 3.

2. The composition of claim 1, wherein the carbon black is intimately mixed with a filler having hydrophobic properties in which the mixture is inert to the R' radicals linked to the siloxane, the organosilicon compound and the titanium compound, said filler having been treated with a hydrophobic agent selected from the group consisting of cyclic alkyl polysiloxanes and silicon compounds of the formula $$(R'''_3Si)_eZ \text{ and } R'''_{e'}SiZ'_{4-e'}$$

in which R''' is selected from the group consisting of monovalent hydrocarbon radicals and halogenated monovalent hydrocarbon radicals, Z and Z' are selected from the group consisting of halogen, hydrogen and a radical of the formula —OR'''', —NR''''X' and —ONR'''' and when e is 2, then Z may be selected from the group consisting of —O— and NX', R'''' is selected from the group consisting of hydrocarbon radicals and substituted hydrocarbon radicals, X' is selected from the group consisting of hydrogen and R'''', e is 1 or 2 and e' is 1, 2 or 3.

3. The composition of claim 1 wherein the carbon black is mixed with a filler and the resultant mixture is then treated with a hydrophobic agent to impart hydrophobic properties thereto, in which the treated mixture is inert to the R' radicals linked to the siloxane, the organosilicon compound and the titanium compound, said hydrophobic agent is selected from the group consisting of cyclic alkyl polysiloxanes and silicon compounds of the formula $$(R'''_3Si)_eZ \text{ and } R'''_{e'}SiZ'_{4-e'}$$

in which R''' is selected from the group consisting of monovalent hydrocarbon radicals and halogenated monovalent hydrocarbon radicals, Z and Z' are selected from the group consisting of halogen, hydrogen and a radical of the formula —OR'''', —NR''''X' and —ONR'''' and when e is 2, then Z may be selected from the group consisting of —O— and NX', R'''' is selected from the group consisting of hydrocarbon radicals and substituted hydrocarbon radicals, X' is selected from the group consisting of hydrogen and R'''', e is 1 or 2 and e' is 1, 2 or 3.

4. A method for curing the composition of claim 1 to an elastomeric solid which comprises exposing the composition to atmospheric moisture.

5. The cured composition of claim 1.

6. A method for preparing the composition of claim 1 which comprises mixing under anhydrous conditions (1) an organopolysiloxane of the formula

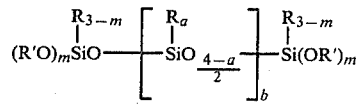

(2) an organosilicon compound selected from the group consisting of silanes of the formula $$R''_nSi(OR')_{4-n}$$

and siloxanes of the formula

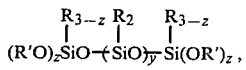

(3) a titanium compound of the formula $$Ti(OR')_4$$

or partial hydrolyzates thereof in which R is selected from the group consisting of monovalent hydrocarbon radicals, halogenated monovalent hydrocarbon radicals having from 1 to 18 carbon atoms and cyanoalkyl radicals, R' is an aliphatic hydrocarbon radical having up to 10 carbon atoms, R'' is selected from the group consisting of monovalent hydrocarbon radicals and halogenated monovalent hydrocarbon radicals having from 1 to 10 carbon atoms, a has an average value of from 1.9 to 2.0, b has a value greater than 10, m has a value of at least 2, n has a value of 0, 1 or 2, y has a value of from 0 to 10 and z has a value of 1, 2 or 3, with the proviso that the R' radicals in the siloxane, the organosilicon compound and the titanium compound must be identical and (4) carbon black which has been treated with a hydrophobic agent to impart hydrophobic properties thereto, in which the treated carbon black is inert to the R' radicals linked to the siloxane, the organosilicon compound and the titanium compound, said hydrophobic agent is selected from the group consisting of cyclic alkyl polysiloxanes and silicon compounds of the formula $$(R'''_3Si)_eZ \text{ and } R'''_{e'}SiZ'_{4-e'}$$

in which R''' is selected from the group consisting of monovalent hydrocarbon radicals and halogenated monovalent hydrocarbon radicals, Z and Z' are selected from the group consisting of halogen, hydrogen and a radical of the formula —OR'''', —NR''''X' and —ONR'''' and when e is 2, then Z may be selected from the group consisting of —O— and NX', R'''' is selected from the group consisting of hydrocarbon radicals and substituted hydrocarbon radicals, X' is selected from the group consisting of hydrogen and R'''', e is 1 or 2 and e' is 1, 2 or 3.

7. The method of claim 6, wherein the carbon black is intimately mixed with a filler having hydrophobic properties prior to being mixed with the organopolysiloxane (1), organosilicon compound (2) and titanium compound (3), in which the mixture is inert to the R' radicals linked to the siloxane, the organosilicon compound and the titanium compound, said filler having been treated with a hydrophobic agent selected from the group consisting of cyclic alkyl polysiloxanes and silicon compounds of the formula $(R'''_3Si)_eZ$ and $R'''_{e'}SiZ'_{4-e'}$ in which R''' is selected from the group consisting of monovalent hydrocarbon radicals and halogenated monovalent hydrocarbon radicals, Z and Z' are selected from the group consisting of halogen, hydrogen and a radical of the formula —OR'''', —NR''''X' and —ONR'''' and when e is 2, then Z may be selected from the group consisting of —O— and NX', R'''' is selected from the group consisting of hydrocarbon radicals and substituted hydrocarbon radicals, X' is selected from the group consisting of hydrogen and R'''', e is 1 or 2 and e' is 1, 2 or 3.

8. The method of claim 6, wherein the carbon black is mixed with a filler and the resultant mixture is then treated with a hydrophobic agent to impart hydrophobic properties thereto prior to being mixed with the organopolysiloxane (1) organosilicon compound (2) and titanium compound (3), in which the treated mixture is inert to the R' radicals linked to the siloxane, the organosilicon compound and the titanium compound, said hydrophobic agent is selected from the group consisting of cyclic alkyl polysiloxanes and silicon compounds of the formula $(R'''_3Si)_eZ$ and $R'''_{e'}SiZ'_{4-e'}$ in which R''' is selected from the group consisting of monovalent hydrocarbon radicals and halogenated monovalent hydrocarbon radicals, Z and Z' are selected from the group consisting of halogen, hydrogen and a radical of the formula —OR'''', —NR''''X' and —ONR'''' and when e is 2, then Z may be selected from the group consisting of —O— and NX', R'''' is selected from the group consisting of hydrocarbon radicals and substituted hydrocarbon radicals, X' is selected from the group consisting of hydrogen and R'''', e is 1 or 2 and e' is 1, 2 or 3.

9. A method for imparting hydrophobic properties to carbon black which comprises treating carbon black with a hydrophobic agent selected from the group consisting of cyclic alkyl polysiloxanes and silicon compounds of the formula $(R'''_3Si)_eZ$ and $R'''_{e'}SiZ'_{4-e'}$ in which R''' is selected from the group consisting of monovalent hydrocarbon radicals and halogenated monovalent hydrocarbon radicals, Z and Z' are selected from the group consisting of halogen, hydrogen and a radical of the formula —OR'''', —NR''''X' and —ONR'''' and when e is 2, then Z may be selected from the group consisting of —O— and NX', R'''' is selected from the group consisting of hydrocarbon radicals and substituted hydrocarbon radicals, X' is selected from the group consisting of hydrogen and R'''', e is 1 or 2 and e' is 1, 2 or 3.

10. The method of claim 9, wherein carbon black is combined with a silica filler prior to treating with the hydrophobic agent.

11. A method for imparting hydrophobic properties to carbon black which comprises treating a silica filler with a hydrophobic agent selected from the group consisting of cyclic alkyl polysiloxanes and silicon compounds of the formula $(R'''_3Si)_eZ$ and $R'''_{e'}SiZ'_{4-e'}$ in which R''' is selected from the group consisting of monovalent hydrocarbon radicals and halogenated monovalent hydrocarbon radicals, Z and Z' are selected from the group consisting of halogen, hydrogen and a radical of the formula —OR'''', —NR''''X' and —ONR'''' and when e is 2, then Z may be selected from the group consisting of —O— and NX', R'''' is selected from the group consisting of hydrocarbon radicals and substituted hydrocarbon radicals, X' is selected from the group consisting of hydrogen and R'''', e is 1 or 2 and e' is 1, 2 or 3, and thereafter mixing carbon black with the treated silica filler in a ratio of carbon black to silica filler of from 1:1 to 50:1.

12. The treated carbon black of claim 11.

* * * * *

UNITED STATES PATENT AND TRADEMARK OFFICE
CERTIFICATE OF CORRECTION

PATENT NO. : 4,221,693
DATED : September 9, 1980
INVENTOR(S) : John C. Getson and Charles G. Neuroth It is certified that error appears in the above-identified patent and that said Letters Patent are hereby corrected as shown below:

On the Title Page insert:

[73] Assignee: SWS Silicones Corporation, Adrian, Michigan

Signed and Sealed this

Seventeenth Day of February 1981

[SEAL]

Attest:

RENE D. TEGTMEYER

Attesting Officer    Acting Commissioner of Patents and Trademarks